March 20, 1951  A. H. OSWALD ET AL  2,545,747
ROTARY SPREADER ATTACHMENT FOR GRAIN DRILLS
Filed March 17, 1948  2 Sheets-Sheet 1

Inventors
Albert H. Oswald &
Violet M. Oswald

By Patrick D. Beavers
ATTY.

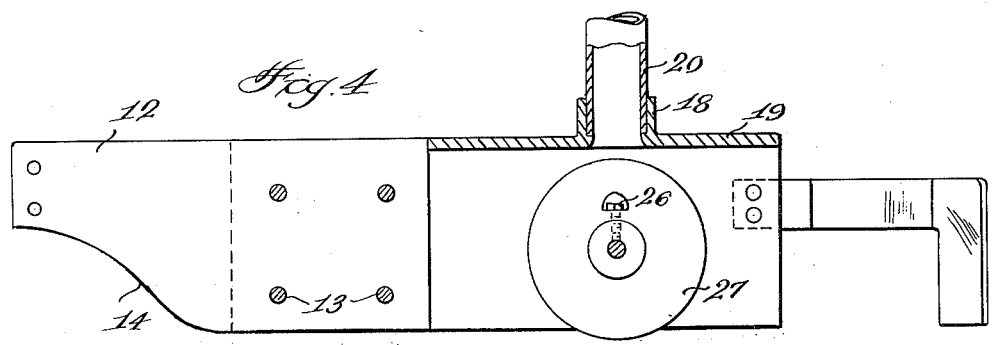
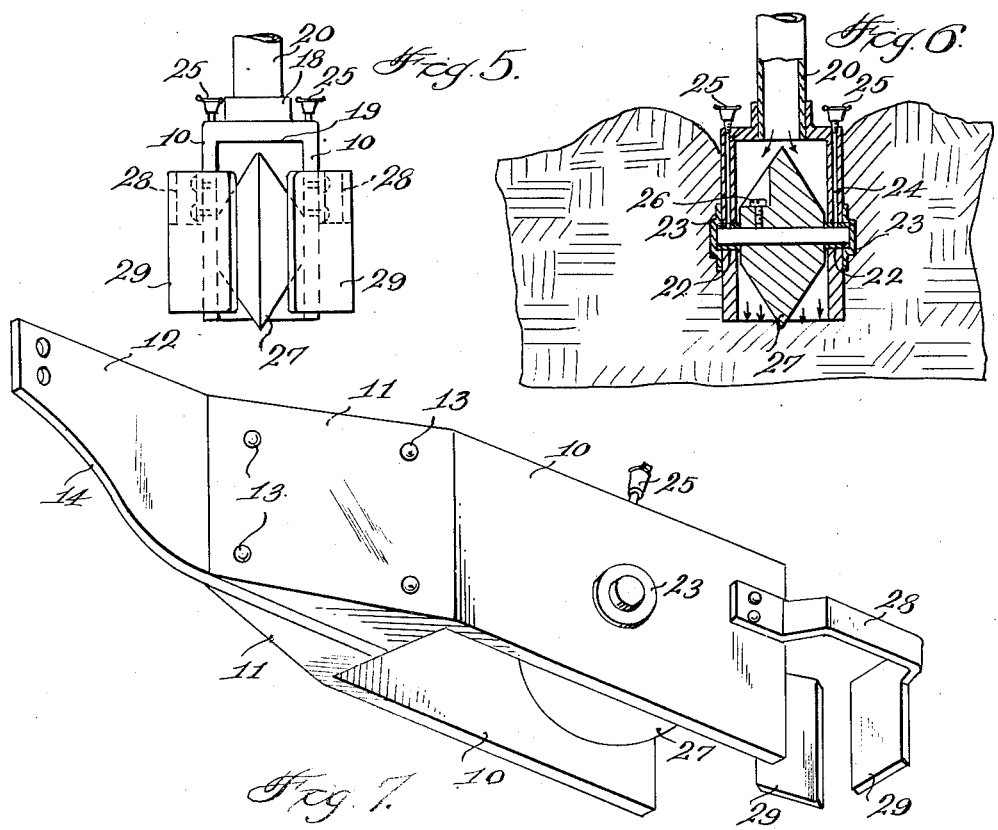

Patented Mar. 20, 1951

2,545,747

UNITED STATES PATENT OFFICE 2,545,747

ROTARY SPREADER ATTACHMENT FOR GRAIN DRILLS

Albert H. Oswald and Violet M. Oswald, Greenwood, Wis.

Application March 17, 1948, Serial No. 15,468

1 Claim. (Cl. 111—85)

The present invention relates to spreader attachments for grain and it consists in the combinations, constructions and arrangements of parts herein described and claimed.

It is an object of the present invention to provide an attachment for grain drills which will evenly distribute seed in a trench and cover the same with soil.

A further object of the invention is to provide a novel revoluble beveled wheel for scattering seed from a grain pipe forming a part of the invention.

Another object of the invention is the provision of a device of the character set forth above which will be extremely simple in its construction and operation and which will be effective and efficient in use.

Figure 1:
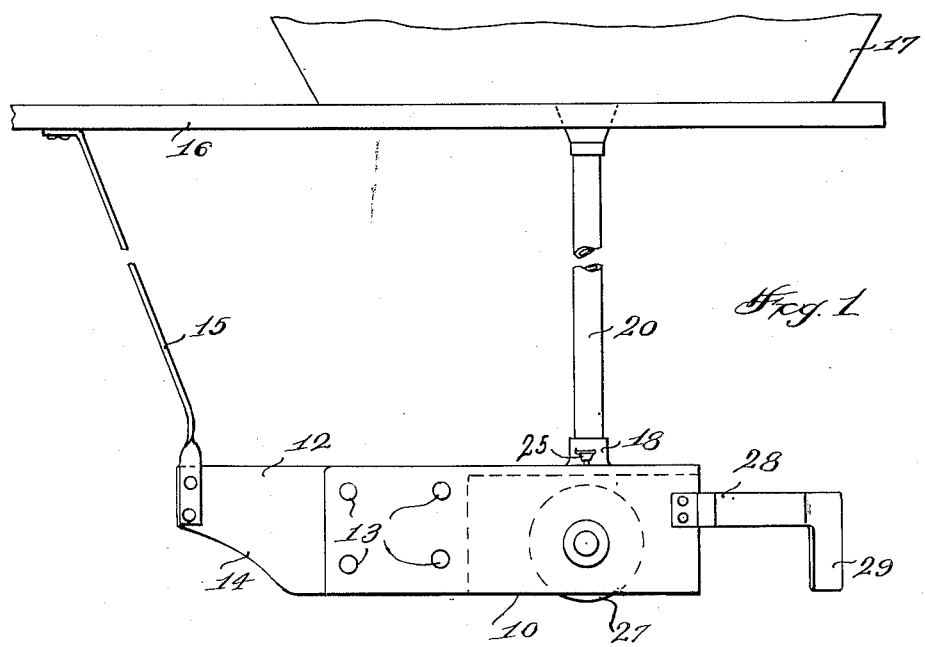
Figure 2:
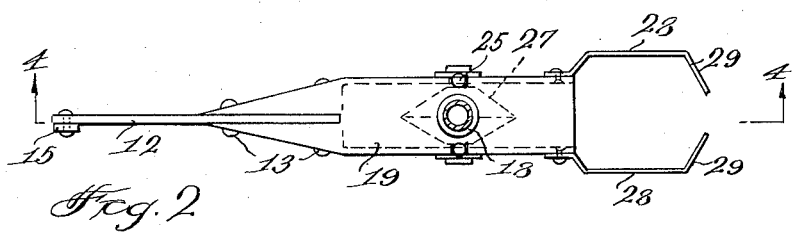
Figure 3:
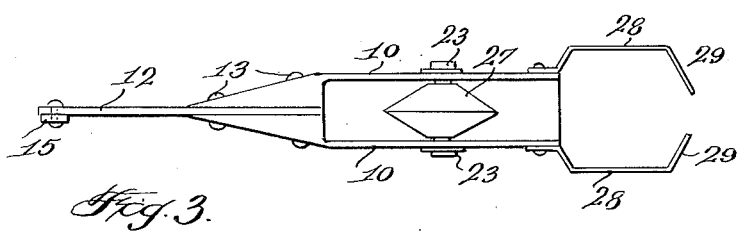

Other and further objects of the invention will become apparent from a reading of the following specification taken in conjunction with the drawings, in which:

Figure 1 is a side elevational view of an embodiment of the invention attached to a grain drill, Figure 2 is a top plan view of the attachment, Figure 3 is a bottom plan view of the attachment, Figure 4 is an enlarged sectional view taken along line 4—4 of Figure 2, Figure 5 is a rear elevational view of the attachment, Figure 6 is an enlarged fragmentary vertical sectional view, partly in elevation, illustrating certain details of construction, and Figure 7 is an enlarged perspective view of the underside of the attachment.

Generally there is provided an attachment for grain drills which consists essentially of a pair of elongated side members having a blade encompassed between them at their forward end, a seed-distributing wheel mounted upon a transversely extending axle substantially at the center of the side members and a shovel affixed at the rear of each side member for covering with soil a trench formed by the passage of the blade and side members through the soil. The device is provided with an opening above the wheel for the reception of seed from a grain pipe and the wheel is beveled so that seed dropping upon the revolving wheel will be scattered evenly within the confines of the side members, thus substantially increasing the yield per acre over the present methods of planting which confined the grain in extremely narrow rows.

Referring more particularly to the drawings, there is shown therein an attachment for grain drills comprising a pair of vertically and longitudinally extending side frame members 10 each having an integrally formed forwardly diminishing triangular bracket 11 at its forward end.

A vertically extending blade 12 is rigidly affixed between the brackets 11 by means of transversely extending bolts 13. The forward underside of the blade is cut away, as indicated at 14, and a rod 15 interconnects the forward upper end of the blade 12 with the body 16 of a grain drill. The drill carries a seed reservoir 17 which is interconnected with an inlet coupling 18 in a top frame member 19 by a flexible conduit 20. The top frame is shown as being integrally formed with the side members 10 but may be formed of a separate piece of material.

An axle 21 extends transversely between the members 10 and is journalled in bushings 22 carried by said members 10 and a cover 23 is provided for each of the ends of the axle 21.

Each of the side members 10 is provided with a vertically extending duct 24 having an oil cap 25 at its upper end for lubricating the axle 21.

Affixed to the axle 21 by means of a set screw 26 is a distributing wheel 27 having a beveled periphery. To each of the side members 10 is affixed at the rear end thereof a rearwardly extending bracket 28 having an integrally formed, inwardly extending shovel member 29.

In operation, it will be apparent that the attachment is moved through soil by means of the rod 15 and that the blade 12 will act to break up any large clods of earth. The brackets 11 will coact to move the earth to one side, thus leaving a trench, the bottom of which will contact the wheel 27 thereby revolving the same. Seed passing downwardly by gravity from the reservoir 17 through the conduit 20 will strike against the thus revolving wheel and due to the beveled surface thereof will be scattered over the area of the trench encompassed by the side members 10. Thereafter, the shovel members 29 will guide soil at the side of the trench inwardly to cover the seed thus scattered in the trench.

While but one form of the invention has been shown and described herein, it will be readily apparent to those skilled in the art that many minor modifications may be made without departing from the spirit of the invention or the scope of the appended claim.

What is claimed is:

A rotary spreader attachment for grain drills comprising a hollow bottomless frame having elongated vertical side members and a flat top member, said members converging forwardly to form a pointed end, a blade affixed in said pointed forward end, said frame and blade forming a trench when drawn forwardly through the soil, a covering shovel fixed to each of the side members at the rear thereof, an axle mounted transversely in the frame for rotation, a wheel having a double beveled outer periphery fixed to said axle and adapted to contact the bottom of the trench for rotation of the wheel, and means over said wheel for feeding grain to the wheel, whereby the grain is spread over the area of the trench encompassed by the frame.

ALBERT H. OSWALD.
VIOLET M. OSWALD.

REFERENCES CITED

The following references are of record in the file of this patent:

UNITED STATES PATENTS

| Number | Name | Date |
|---|---|---|
| 488,775 | Scandracof et al. | Dec. 27, 1892 |
| 597,644 | Gongwer | Jan. 18, 1898 |
| 748,717 | Funk | Jan. 5, 1904 |
| 965,936 | Quickel | Aug. 2, 1910 |
| 1,234,525 | Aspinwall | July 24, 1917 |
| 2,144,142 | Buehler | Jan. 17, 1939 |

FOREIGN PATENTS

| Number | Country | Date |
|---|---|---|
| 119,027 | Australia | Oct. 3, 1944 |